Patented Mar. 30, 1937

2,075,295

UNITED STATES PATENT OFFICE 2,075,295

ORGANIC SULPHIDES AND A METHOD FOR THEIR PREPARATION

Donald J. Loder, Wilmington, Del., assignor to E. I. du Pont de Nemours & Company, Wilmington, Del., a corporation of Delaware No Drawing. Application August 16, 1933, Serial No. 685,418

16 Claims. (Cl. 260—151)

The present invention relates to new compositions of matter and methods for their preparation, and more particularly to the sulphide derivatives of the mixture of oxygenated organic compounds obtained by the catalytic hydrogenation of carbon oxides under elevated temperatures and pressures.

In the catalytic hydrogenation of the oxides of carbon there are produced, under certain conditions of operation, mixtures of oxygen-containing organic compounds of a higher order than methanol, which products, usually of an oily consistency, comprise chiefly the saturated alcohols containing four or more carbon atoms together with saturated and unsaturated compounds such as the aldehydes, ketones, esters, and the like. A number of U. S. patents describe methods for the preparation of these compounds, e. g. U. S. 1,820,417 and U. S. 1,844,847. The heterogeneous mixture of compounds obtained in accord with the processes disclosed in these patents and by equivalent processes have a boiling range of from 90° C. up. The whole mixture of oxygenated compounds boiling from approximately 90° C. up have been fractionated systematically to a series of fractions, namely, 90–133; 133–147; 147–157; 157–195; and 195° C. up, which will hereinafter be designated by fractions of the higher oxygenated organic compounds, the whole mixture of compounds boiling above 90° C. will hereinafter be designated as the higher oxygenated organic compounds. Due to the complexity of the mixture and of the compounds contained therein all of the individual compounds in the composition have not been identified. It is known, however, that the total composition before separation into the various fractions includes such compounds as normal propanol, isobutanol, 3-methyl butanol-1, 3-methyl butanol-2, 2,4-dimethyl pentanol-3, 3-pentanol-2, 4-methyl hexanol-1, 4-methyl heptanol-1, together with aldehydes, ketones, and esters, conforming closely in their number of alkyl group to the alcohols above mentioned. It is from this mixture of oxygenated organic compounds and fractions thereof that I prepare my new compositions of matter.

An object of the present invention is to provide new compositions of matter from the above designated mixtures of oxygenated organic compounds. Another object of the invention is to provide as new compositions of matter the sulphide, mercaptan, mercaptal, di- and poly-sulphide derivatives of the mixture of higher oxygenated organic compounds obtained by the catalytic hydrogenation of carbon oxides under elevated temperatures and pressures. A still further object of the invention is to provide a process for the preparation of the sulphides, mercaptans, mercaptals, and di- and poly-sulphides, of the mixture of higher oxygenated organic compounds. A further object of the invention is to provide a series of mixtures of new compositions of matter having different chemical and physical characteristics which are obtained by first preparing sulphuric acid derivatives of the higher oxygenated organic compounds, neutralizing the resulting derivatives to obtain an alkali metal salt thereof, and finally treating the alkali metal salt obtained with an alkali metal or alkaline earth metal sulphide to obtain a mixture of sulphides and/or mercaptans of the higher oxygenated organic compounds. Other objects and advantages will hereinafter appear.

I have found that the sulphides of the mixtures of higher oxygenated organic compounds obtained from the catalytic hydrogenation of carbon oxides under elevated temperatures and pressures can be prepared by reacting the composite mixture or one or more of the above indicated or other suitable fractions thereof with a strong sulphating agent, such as sulphuric acid of from 96–100% strength, fuming sulphuric acid, chlorsulphuric acid, sulphurtrioxide, and the like. The resulting ester is neutralized with alkali or alkaline earth caustic and the salts then reacted with sodium sulphide or an equivalent alkali metal or alkaline earth metal sulphide to give the sulphide and mercaptan of the higher oxygenated organic compounds or with a sodium hydrogen sulphide to give almost exclusively the mercaptans of these compounds. Due, of course, to the heterogeneous character of the higher oxygenated organic compounds the resulting product consists of a mixture of many different sulphides and mercaptans of the compounds present in the mixture treated.

These compositions may be utilized for many purposes such, for example, as insecticides, flotation agents, inhibitors in pickling baths, and as an intermediate for the preparation of the mercaptals, disulphides, polysulphides, and the alkali metal and alkyl thioesters of the aliphatic carboxylic acids. These compounds may be obtained by well known methods from my sulphide derivatives of the oxygenated organic compounds, e. g. the disulphides may be obtained by oxidizing the sodium salt of the mercaptan with iodine or sulphuryl chloride; the mercaptals by reacting the mercaptan with aldehyde; thioesters by esterification of the mercaptans with organic acids and methyl thioacetic acid and equivalent alkyl thio-aliphatic carboxylic acids by analogous reactions may be obtained by reacting the mercaptan of the higher oxygenated organic compounds with acetic acid.

I shall now describe methods illustrating the details of my process for the preparation of the sulphide derivatives of the higher oxygenated organic compounds, but it will be understood that the details given are merely illustrative and in no way limit the scope of my invention.

*Example 1.*—To 875 grams of the higher oxygenated organic compounds boiling between 157–195° C. was added with constant stirring 700 grams of chlorsulphonic acid. During the addition the temperature was maintained below 40° C. After a period of two hours the reaction was substantially complete and the crude sulphuric ester was then poured slowly into an iced mixture of sodium hydroxide, 40% strength. During the neutralization the temperature was regulated by means of addition of ice to below 50° C. The total volume of crude salt solution was 4650 cc. An autoclave was then charged with 4140 cc. of the crude solution of sodium salts and 1360 grams of sodium sulphide ($Na_2S.9HOH$). The mixture was heated to 150–165° C. under approximately 80–85 lbs. pressure for a period of 5½ hours, at which time the reaction was substantially complete. A 354 gram product of crude sulphide and mercaptan of the higher oxygenated compounds was obtained and this mixture was then separated by fractional distillation; the mercaptan portion which contained some of the unreacted oxygenated organic compounds was further treated with caustic solution for separation of the mercaptan. The mercaptan mixture had a boiling range of from 47–125° C. at 16.5 mm. pressure, and was obtained with a yield of 26.7% based on the reacted higher compounds. The mixture of sulphides had a boiling range of from 125–157° C. at 16.5 mm. and was obtained with a yield of 33.2% on the same basis.

*Example 2.*—Into a three-necked three-liter flask equipped with a stirrer and dropping funnel was placed 1000 grams of the higher oxygenated organic compounds boiling between 147–157° C. The compounds were cooled to 10° C. and 1000 grams of chlorsulphonic acid was dropped in slowly while maintaining the temperature at approximately 10° C. After 2½ hours the temperature was allowed to rise gradually to room temperature and the reaction permitted to proceed for another four hours. The product was then neutralized by pouring simultaneously with sodium hydroxide, 20% strength, slowly into a flask maintained in a cooling bath. The neutralization took a period of approximately 1½ hours. The resulting product was charged into an autoclave and 2000 grams of sodium sulphide ($Na_2S.9H_2O$), were added in solid form. The temperature was raised to and maintained within the range of 160–175° C. with a resulting pressure of 50–90 lbs. per square inch and the reaction allowed to proceed for a period of approximately five hours. The product was then separated by fractional distillation from the unreacted higher oxygenated organic compounds and a yield, based on the reactive higher oxygenated organic compounds, of 6.3% by weight of mixed mercaptans of the higher oxygenated organic compounds, and 26.6% by weight of the mixture of sulphides of the higher oxygenated organic compounds were obtained, both yields being based on the compounds which reacted.

*Example 3.*—A product can be obtained containing a higher percentage of mercaptan by reacting 4000 cc. of the crude sulphuric acid salt solution as obtained in the first step of Example 1 with approximately 1300 grams of sodium hydrogen sulphide while under substantially the same temperature and pressure conditions as given in that example.

*Example 4.*—By effecting the reaction, as described in Example 3, under an atmosphere of hydrogen sulphide a still higher proportion of the mercaptan is obtainable.

From a consideration of the above specification, it will be realized that any improvement in the product or process disclosed herein will come within the scope of this invention without sacrificing any of the advantages that may be derived therefrom.

I claim:

1. A mixture of mercaptans of the higher oxygenated organic compounds obtained from the catalytic hydrogenation of carbon oxides under elevated temperatures and pressures, the oxygenated organic compounds prior to conversion boiling above 90° C. and said mixture being obtained by treating the neutralized acid esters of the compounds with a sulphide selected from the group consisting of alkali metal and alkaline earth metal sulphides.

2. A mixture of sulphides and mercaptans of the higher oxygenated organic compounds obtained from the catalytic hydrogenation of carbon oxides under elevated temperatures and pressures, the oxygenated organic compounds prior to conversion boiling above 90° C. and said mixture being obtained by treating the neutralized acid esters of the compounds with a sulphide selected from the group consisting of alkali metal and alkaline earth metal sulphides.

3. A mixture of sulphide derivatives of the higher oxygenated organic compounds obtained from the catalytic hydrogenation of carbon oxides under elevated temperatures and pressures obtained by treating the neutralized acid esters of the compounds with a sulphide selected from the group consisting of the alkali metal and alkaline earth metal sulphides, the compounds prior to conversion to the sulphide boiling above 90° C.

4. A mixture of sulphide derivatives of the higher oxygenated organic compounds obtained from the catalytic hydrogenation of carbon oxides under elevated temperatures and pressures obtained by treating the neutralized acid esters of the compounds with a sulphide selected from the group consisting of the alkali metal and alkaline earth metal sulphides, the compounds prior to conversion to the sulphide boiling between 147 and 157° C.

5. A mixture of sulphide derivatives of the higher oxygenated organic compounds obtained from the catalytic hydrogenation of carbon oxides under elevated temperatures and pressures obtained by treating the neutralized acid esters of the compounds with a sulphide selected from the group consisting of the alkali metal and alkaline earth metal sulphides, the compounds prior to conversion to the sulphide boiling between 157 and 195° C.

6. In a process for the preparation of the sulphides of the higher oxygenated organic compounds obtained by the catalytic hydrogenation of carbon oxides the steps which comprise first obtaining a sulphuric acid derivative of the higher oxygenated organic compounds which prior to conversion boil above 90° C., neutralizing the sulphuric acid derivatives with an alkali to obtain the alkali metal salts thereof and finally reacting the alkali metal salt of the sulphuric acid derivative with an alkali metal sulphide.

7. In a process for the preparation of the mercaptans of the higher oxygenated organic compounds obtained by the catalytic hydrogenation of carbon oxides the steps which comprise first obtaining a sulphuric acid derivative of the higher oxygenated organic compounds which prior to conversion boil above 90° C., neutralizing the sulphuric acid derivatives with an alkali to obtain the alkali metal salts thereof, and finally reacting the alkali metal salt of the sulphuric acid derivative with an alkali metal hydrogen sulphide.

8. In a process for the preparation of the mercaptans of the higher oxygenated organic compounds obtained by the catalytic hydrogenation of carbon oxides the steps which comprise first obtaining a sulphuric acid derivative of the higher oxygenated organic compounds which prior to conversion boil above 90° C., neutralizing the sulphuric acid derivatives with an alkali to obtain the alkali metal salts thereof, and finally reacting the alkali metal salt of the sulphuric acid derivative with an alkali metal sulphide under an atmosphere of hydrogen sulphide.

9. In a process for the preparation of the sulphide derivatives of the higher oxygenated organic compounds the steps which comprise obtaining a sulphuric acid derivative of the oxygenated organic compounds obtained by the catalytic hydrogenation of carbon oxides under elevated temperatures and pressures which prior to conversion boil above 90° C. by reacting them with a sulphating agent, neutralizing the resulting sulphuric acid esters of the compounds with an alkali, and finally under elevated temperatures and pressures reacting the resulting alkali metal salt of the ester of the oxygenated compounds with an alkali metal sulphide.

10. In a process for the preparation of the mercaptan derivatives of the higher oxygenated organic compounds the steps which comprise obtaining a sulphuric acid derivative of the oxygenated organic compounds obtained by the catalytic hydrogenation of carbon oxides under elevated temperatures and pressures which prior to conversion boil above 90° C. by reacting them with a sulphating agent, neutralizing the resulting sulphuric acid esters of the compounds with an alkali, and finally under elevated temperatures and pressures reacting the resulting alkali metal salt of the ester of the oxygenated compounds with an alkali metal hydrogen sulphide.

11. In a process for the preparation of the mercaptan derivatives of the higher oxygenated organic compounds obtained from the catalytic hydrogenation of carbon oxides under elevated temperatures and pressures the steps which comprise reacting a mixture of the compounds boiling above 90° C. with chlorsulphonic acid while maintaining the temperature below 40° C., neutralizing the resulting sulphuric acid derivatives with sodium hydroxide of approximately 40% strength and subsequently reacting the resulting sodium salts of the compounds with an alkali sulphide.

12. In a process for the preparation of the mercaptan derivatives of the higher oxygenated organic compounds obtained from the catalytic hydrogenation of carbon oxides under elevated peratures and pressures the steps which comprise reacting a mixture of the compounds boiling between 147 and 157° C. with substantially an equal weight of chlorsulphonic acid while maintaining the temperature at approximately 10° C., neutralizing the resulting product with a 20% sodium hydroxide solution and subsequently reacting the resulting neutralized product with sodium sulphide ($Na_2S.9H_2O$), the amount of sodium sulphide employed being approximately twice the amount of the compounds originally reacted.

13. In a process for the preparation of the mercaptan derivatives of the higher oxygenated organic compounds obtained from the catalytic hydrogenation of carbon oxides under elevated temperatures and pressures the steps which comprise reacting a mixture of the compounds boiling between 157 and 195° C. with chlorsulphonic acid, neutralizing the resulting product with sodium hydroxide of 40% strength and subsequently reacting the neutralized product with sodium sulphide.

14. A mixture of mercaptans prepared in accord with the process of claim 11.

15. A mixture of mercaptans prepared in accord with the process of claim 12.

16. A mixture of mercaptans prepared in accord with the process of claim 13.

DONALD J. LODER.